(12) United States Patent
Bandhakavi et al.

(10) Patent No.: US 8,542,637 B2
(45) Date of Patent: Sep. 24, 2013

(54) CLUSTERING CROWD-SOURCED DATA FOR DETERMINING BEACON POSITIONS

(75) Inventors: Sindhura Bandhakavi, Redmond, WA (US); Weili Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 13/008,034

(22) Filed: Jan. 18, 2011

(65) Prior Publication Data

US 2012/0182933 A1 Jul. 19, 2012

(51) Int. Cl.
*H04W 4/00* (2009.01)
(52) U.S. Cl.
USPC .......................................... 370/328; 455/456.1
(58) Field of Classification Search
USPC .................. 370/328; 455/456.1; 715/723
See application file for complete search history.

(56) References Cited

U.S. PATENT DOCUMENTS

| | | | |
|---|---|---|---|
| 6,704,301 B2 | 3/2004 | Char et al. | |
| 6,763,224 B2 | 7/2004 | Davies et al. | |
| 7,184,421 B1 | 2/2007 | Liu et al. | |
| 7,492,736 B2 | 2/2009 | Ho | |
| 7,787,437 B2 | 8/2010 | Sakoda | |
| 2006/0095348 A1 | 5/2006 | Jones et al. | |
| 2008/0280624 A1 | 11/2008 | Wrappe | |
| 2009/0224909 A1 | 9/2009 | Derrick et al. | |
| 2009/0232056 A1 | 9/2009 | Doi et al. | |
| 2010/0254345 A1 | 10/2010 | Raravi et al. | |
| 2011/0047463 A1* | 2/2011 | Shepherd et al. | 715/723 |
| 2011/0306357 A1* | 12/2011 | Alizadeh-Shabdiz et al. | 455/456.1 |

OTHER PUBLICATIONS

Ramalingam, et al., "Associativity based cluster formation and cluster management in ad hoc networks", Retrieved at <<http://www.hipc.org/hipc2002/2002Posters/adhoc_cluster.pdf>>, Mar. 29, 2002, pp. 5.
Jing, et al., "Global Control Plane Architecture for Cognitive Radio Networks", Retrieved at <<http://www.winlab.rutgers.edu/~xjing/CogNetsICC07jing.pdf>>, Jun. 2007, pp. 5.
"Filtering and Clustering Crowd-Sourced Data for Determining Beacon Positions," U.S. Appl. No. 13/185,520, filed Jul. 19, 2011, pp. 37.
Eagle, et al., "Methodologies for Continuous Cellular Tower Data Analysis", Retrieved at << http://reality.media.mit.edu/pdfs/pervasive09.pdf >>, Seventh International Conference on Pervasive Computing, 2009, pp. 1-13.
Kuo, et al., "The Beacon Movement Detection Problem in Wireless Sensor Networks for Localization Applications", Retrieved at << http://www.cs.nctu.edu.tw/~yctseng/papers.pub/sensor16-beacon-movement-ieee-tmc.pdf >>, IEEE Transactions on Mobile Computing, vol. 08, No. 10, Oct. 2009, pp. 13.
Kuo, et al., "Detecting Movement of Beacons in Location-Tracking Wireless Sensor Networks", Retrieved at << http://ieeexplore.ieee.org/stamp/stamp.jsp?tp=&arnumber=4349737 >>, IEEE 66th Vehicular Technology Conference, Sep. 30-Oct. 3, 2007, pp. 362-366.

* cited by examiner

*Primary Examiner* — Anh-Vu Ly
*Assistant Examiner* — Hashim Bhatti

(57) ABSTRACT

Embodiments analyze crowd-sourced data to identify a moved or moving beacon. The crowd-sourced data for the beacon is grouped into a plurality of clusters based on spatial distance. Timestamps associated with the crowd-sourced data in the clusters are compared to select one of the clusters. The crowd-sourced data associated with the selected cluster is used to determine position information for the beacon.

20 Claims, 6 Drawing Sheets

CLUSTERING CROWD-SOURCED DATA FOR DETERMINING BEACON POSITIONS

BACKGROUND

Some existing location services rely on crowd-sourced data to deliver location information to requesting computing devices such as mobile telephones. The existing systems, however, assume that all the beacons are stationary. In practice, some of the beacons may move or be moving, which may result in multiple probable locations for the beacon. Existing location services are not designed to handle this kind of conflict within the crowd-sourced data.

SUMMARY

Embodiments of the disclosure determine a position for a beacon using a clustering analysis. Position observations for the beacon are grouped into a plurality of clusters based on spatial distance. Each of the position observations has a timestamp associated therewith. One of the plurality of clusters is selected based on the timestamps associated with the position observations corresponding to the clusters. A position for the beacon is calculated based on the position observations corresponding to the selected cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure cluster beacon position observations 204 based on distance and time to identify beacons that have moved or are moving. In some embodiments, a k-means clustering algorithm using spatial geographic distance as the partition dimension identifies logical clusters each having a set of the position observations 204. In general, the radii of the individual clusters are smaller than the radius of a single cluster involving all the position observations 204. Further, the distance between the clusters is larger than the radii of each cluster.

Based on timestamps associated with the position observations 204 in the clusters, identifying beacons that have moved or moving enables more accurate position location information to be calculated by eliminating outdated position observations 204 from the calculation. In some embodiments, clusters having mutually exclusive sets of position observations 204 indicate that the beacon has moved. For example, all the observed dates in one cluster precede the observed dates in the other cluster. In contrast, clusters having position observations 204 with overlapping dates indicates that the beacon is a moving beacon (e.g., Internet access on public transportation).

Figure 1:
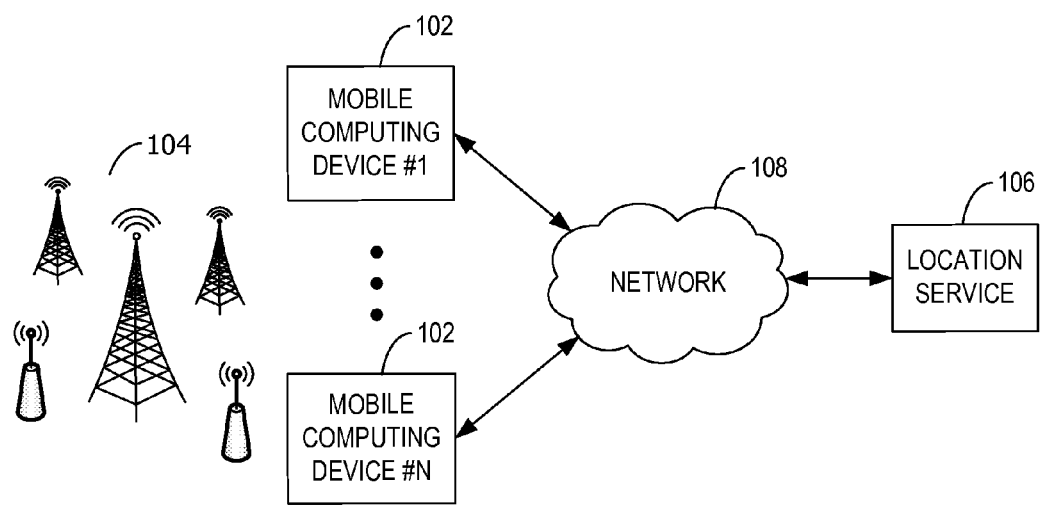
FIG. 1 is an exemplary block diagram illustrating a plurality of mobile computing devices providing crowd-sourced data to a cloud-based location service.

Referring next to FIG. 1, an exemplary block diagram illustrates a plurality of mobile computing devices 102 providing crowd-sourced data to a cloud-based location service 106. The plurality of mobile computing devices 102 include, for example, mobile computing device #1 through mobile computing device #N. In some embodiments, the mobile computing devices 102 include a mobile telephone, laptop, netbook, gaming device, and/or portable media player. The mobile computing devices 102 may also include less portable devices such as desktop personal computers, kiosks, and tabletop devices. Additionally, each of the mobile computing devices 102 may represent a group of processing units or other computing devices.

The mobile computing devices 102 observe or otherwise detect one or more beacons 104 or other cell sites. The beacons 104 represent network elements for connecting the mobile computing devices 102 to other computing devices and/or network elements. Exemplary beacons 104 include cellular towers, base stations, base transceiver stations, base station sites, and/or any other network elements supporting any quantity and type of communication modes. Aspects of the disclosure are operable with any beacon 104 supporting any quantity and type of wireless and/or wired communication modes including cellular division multiple access (CDMA), Global System for Mobile Communication (GSM), wireless fidelity (WiFi), 4G/Wi-Max, and the like.

Each of the mobile computing devices 102 stores properties or dimensions for each observed beacon 104. In some embodiments, exemplary properties include a latitude and longitude of the observing mobile computing device (or other description of the location of the mobile computing device), and an observation time. Other exemplary properties are contemplated, however. For example, other exemplary properties include a signal strength, an access point name (APN), and a destination device to which the mobile computing device 102 is connected or attempting to connect.

When the observations are collected, a first observed time and a last observed time across the collected observations are identified as described below. The first observed time and the last observed time represent the earliest time and the most recent time, respectively, that the mobile computing devices 102 observed the particular beacon 104. Each mobile computing device 102, however, sends only one observation time associated with observation of the beacon 104.

The mobile computing devices 102 send the properties as position observations 204 to the location service 106 via a network 108. The network 108 includes any means for communication between the mobile computing devices 102 and the location service 106.

While described in the context of the location service 106 receiving and processing the observations, aspects of the disclosure contemplate other entities that receive and/or process the position observations 204. The entities include, for example, a cloud-based service, a server, and/or a peer device. The functionality of the location service 106, as described herein, may also be divided among one or more entities. For example, one entity may collect the position observations 204 into a storage area for subsequent processing by the location service 106. The position observations 204 may be processed as they are received (e.g., in real time), or may be stored for future processing (e.g., as a batch). In the example of FIG. 1, the location service 106 performs the functionality next described with reference to FIG. 2.

Figure 2:
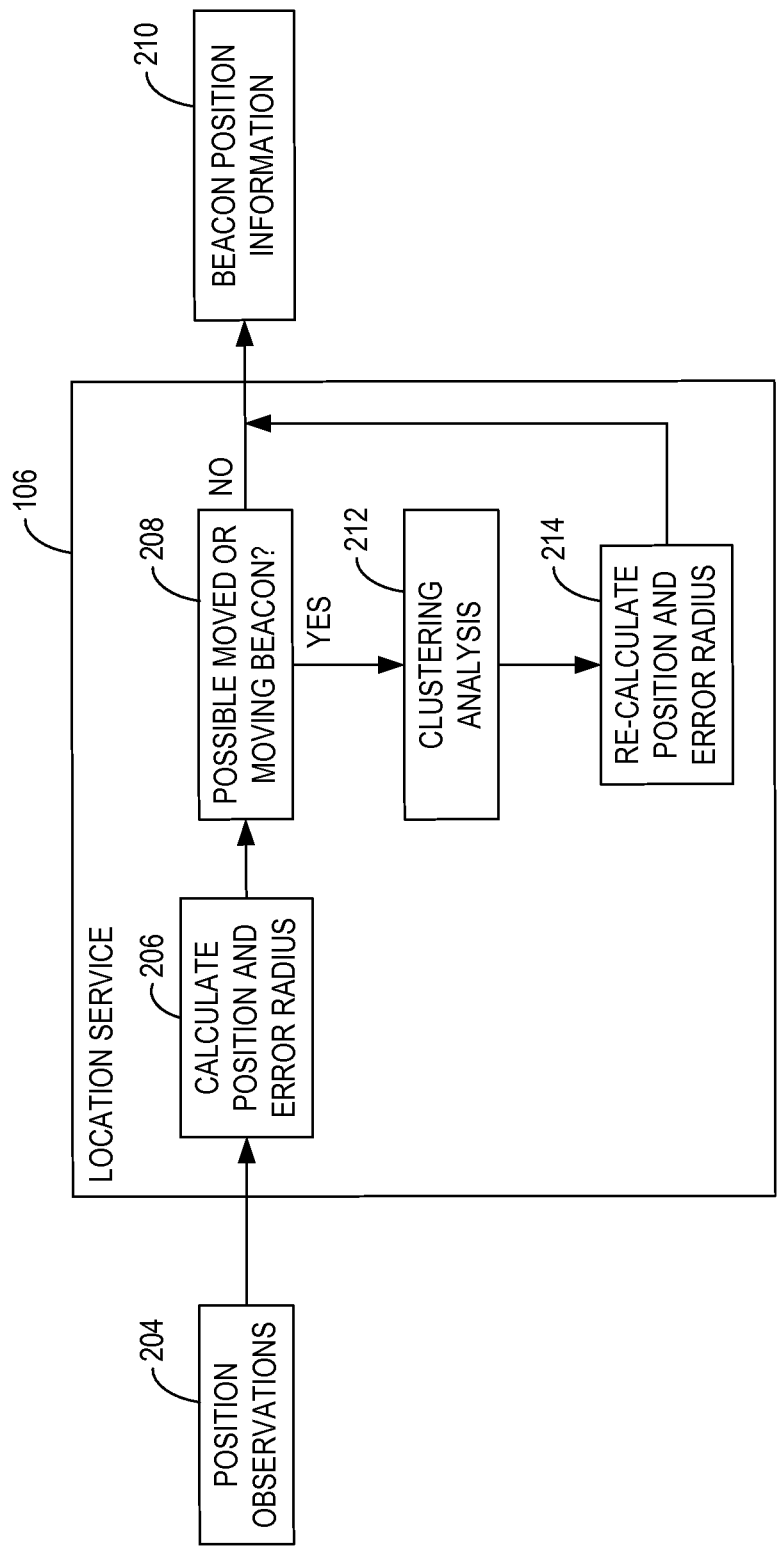
FIG. 2 is an exemplary block diagram illustrating operation of the location service to calculate beacon position information.

Referring next to FIG. 2, an exemplary block diagram illustrates operation of the location service 106 to calculate beacon position information. The location service 106 receives the position observations 204. In some embodiments, receiving the position observations 204 includes receiving, from a mobile computing device 102, a location of the mobile computing device 102 along with a set of beacons 104 observed by the mobile computing device 102. The location and set of beacons 104 may constitute a record representing crowd-sourced data obtained by the mobile computing device 102.

The location service 106 calculates a position and associated error radius for each observed beacon 104 at 206 using the position observations involving that beacon 104. In some embodiments, the error radius represents a range for the beacon 104. The error radius may be dependent on various factors such as beacon type and/or signal strength. The error radius may correspond to, for example, a radius of a circle or other shape (regular or irregular) representing a coverage area for the beacon 104.

Figure 5:
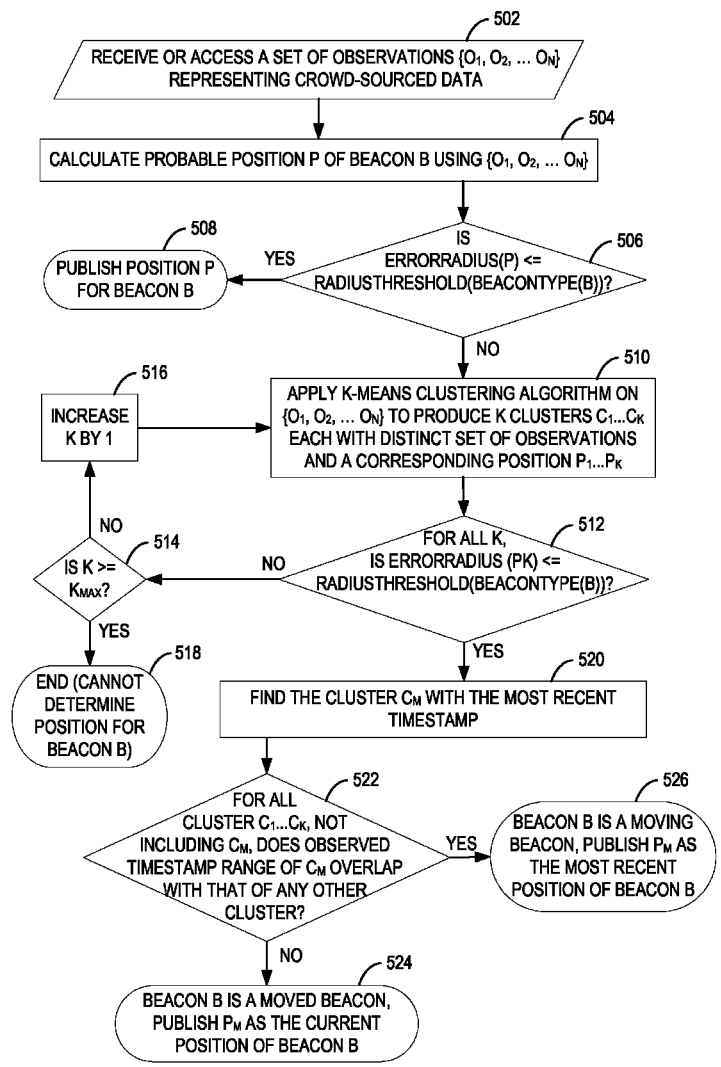
FIG. 5 is an exemplary flow chart illustrating the identification of a beacon as a moved beacon or a moving beacon using a k-means clustering algorithm.

Based on the calculated position and error radius, the location service 106 may conclude that the beacon 104 is possibly a moved beacon or a moving beacon at 208 (e.g., see FIG. 5). If the location service 106 makes such a conclusion, then a clustering analysis is performed at 212 before re-calculating the position and error radius at 214. At 210, the position is output as beacon position information.

In the example of FIG. 2, the location service 106 outputs the beacon position information. In other examples, the location service 106 may output other determinations such as whether the beacon 104 has moved, whether the beacon 104 should be considered a moving beacon, and a set of possible locations for the beacon 104.

Figure 3:
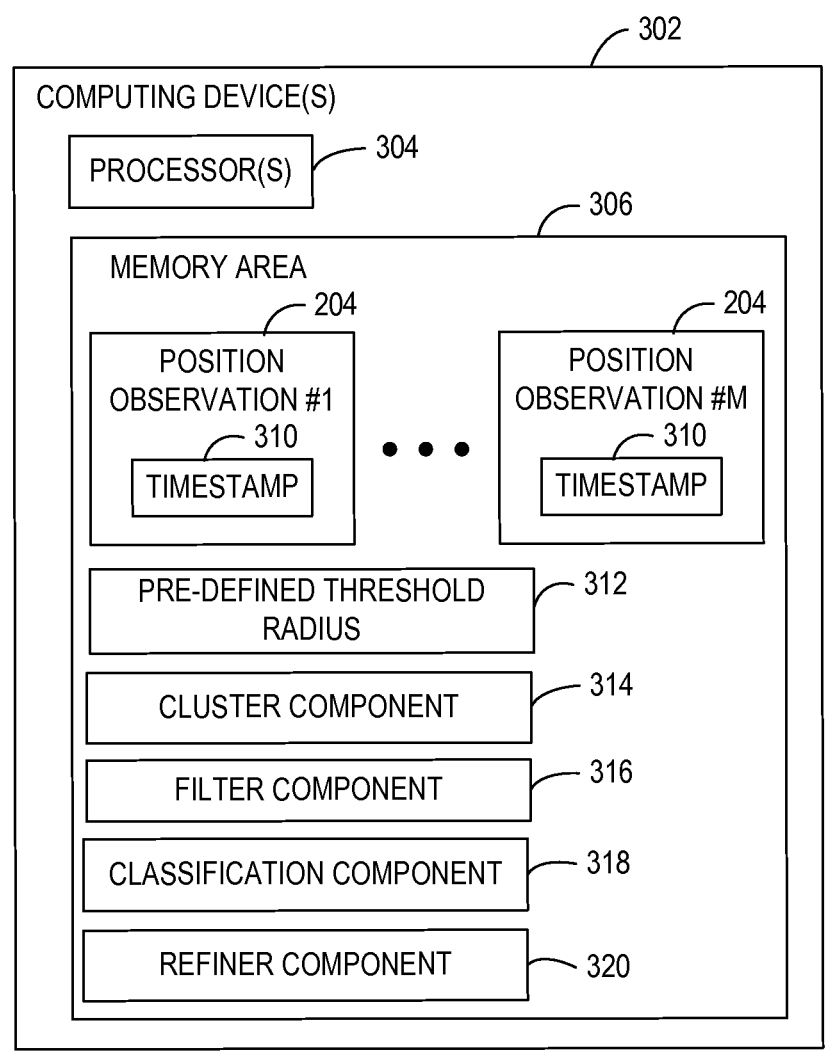
FIG. 3 is an exemplary block diagram illustrating a computing device with computer-executable components for determining the position of a beacon using a clustering analysis.

Referring next to FIG. 3, an exemplary block diagram illustrates one or more computing devices 302 with computer-executable components for determining the position of a beacon 104 using a clustering analysis. In some embodiments, the computing devices 302 represent a cloud-based location determination system such as location service 106 involving a group of processing units or other computing devices. In general, the computing device 302 represents any device executing instructions (e.g., as application programs, operating system functionality, or both) to implement the operations and functionality associated with the computing device 302.

The computing device 302 has at least one processor 304 and a memory area 306. The processor 304 includes any quantity of processing units, and is programmed to execute computer-executable instructions for implementing aspects of the disclosure. The instructions may be performed by the processor 304 or by multiple processors executing within the computing device 302, or performed by a processor external to the computing device 302. In some embodiments, the processor 304 is programmed to execute instructions such as those illustrated in the figures (e.g., FIG. 4 and FIG. 5).

The computing device 302 further has one or more computer-readable media such as the memory area 306. The memory area 306 includes any quantity of media associated with or accessible by the computing device 302. The memory area 306 may be internal to the computing device 302 (as shown in FIG. 3), external to the computing device 302 (not shown), or both (not shown).

The memory area 306 stores, among other data, a plurality of the position observations 204 such as position observation #1 through position observation #M. Each of the position observations 204 represents detection by a computing device (e.g., mobile computing device) of a beacon 104 at a particular time. Each of the position observations 204 includes a timestamp representing the time of observation of the beacon 104 by the mobile computing device 102.

In some embodiments, the computing device 302 includes a network interface card and/or computer-executable instructions (e.g., a driver) for operating the network interface card to receive the position observations 204. In other embodiments (not shown), the position observations 204 are stored separate in a storage area from the computing device 302. In such embodiments, the computing device 302 accesses the storage area to process the position observations 204.

The memory area 306 further stores at least one pre-defined threshold radius 312. The pre-defined threshold radius 312 is used to determine whether a calculated error radius is too large (e.g., see FIG. 5).

The memory area 306 further stores one or more computer-executable components. Exemplary components include a cluster component 314, a filter component 316, a classification component 318, and a refiner component 320. Operation of the computer-executable components is described next with reference to FIG. 4.

Figure 4:
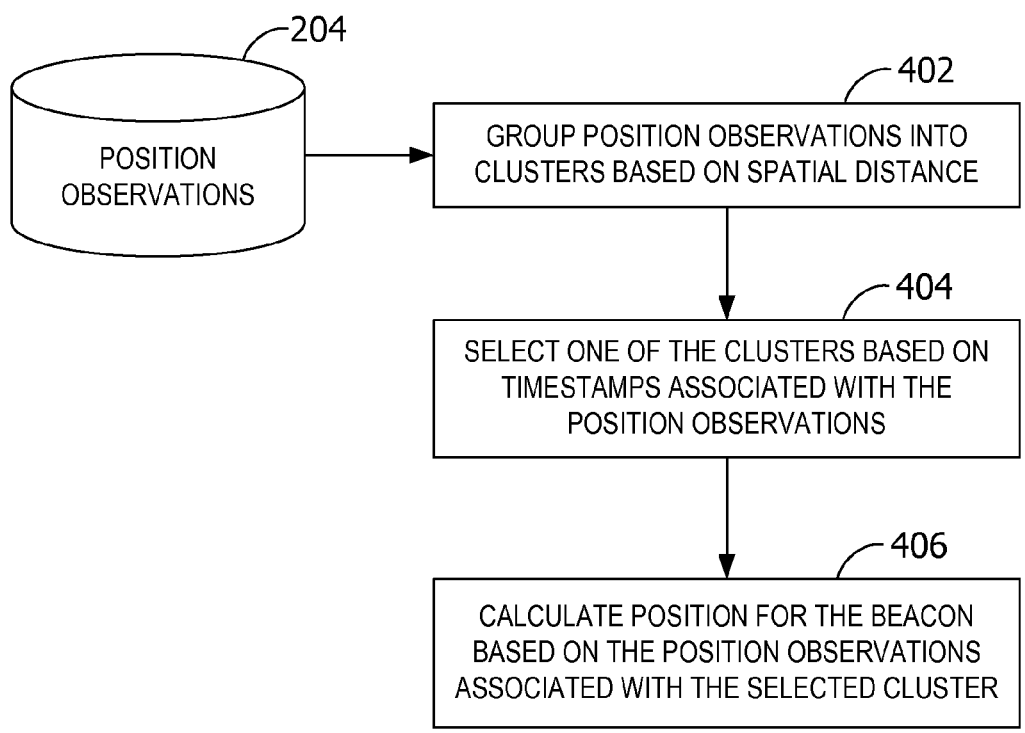
FIG. 4 is an exemplary flow chart illustrating operation of the computing device to group the position observations into clusters for determining beacon position information.

Referring next to FIG. 4, an exemplary flow chart illustrates operation of the computing device 302 to group the position observations 204 into clusters for determining beacon position information. The operations illustrated in FIG. 4 are performed when the computing device 302 concludes that the beacon 104 has not been stationary. For example, the beacon 104 may have moved, or is moving. In some embodiments, the computing device 302 filters the position observations 204 to obtain a set of position observations 204 where each of the position observations 204 in the set includes the beacon 104 of interest. The computing device 302 calculates a position and error radius for the beacon 104 using location determination algorithms with the set of position observations 204 as input. The error radius is compared to a pre-defined threshold radius 312, where the pre-defined threshold radius 312 is based on factors such as, but not limited to, the type of beacon 104 and/or historical data. For example, the pre-defined threshold radius 312 for a WiFi beacon may be 500 meters, while the pre-defined threshold radius 312 for a GSM beacon may be 10 kilometers.

If the error radius does not violate the pre-defined threshold radius 312 (e.g., is less than the pre-defined threshold radius 312), the computing device 302 outputs the calculated position and error radius as the beacon position information and does not perform the operations illustrated in FIG. 4. If the error radius violates the pre-defined threshold radius 312 (e.g., exceeds the pre-defined threshold radius 312), the computing device 302 performs the operations in FIG. 4 as next described to calculated a revised position for the beacon 104.

The computing device 302 (e.g., a cloud-based service) accesses or receives the position observations 204 for one of the beacons 104. In some embodiments, the computing device 302 filters or otherwise searches the position observations 204 to obtain the position observations 204 relating to a particular beacon 104 of interest. At 402, the computing device 302 groups the position observations 204 for the beacon 104 into a plurality of clusters based on spatial distance. In some embodiments, the computing device 302 performs a k-means clustering analysis using spatial distance as the partition dimension. For example, the spatial distance is the error radius of beacon position information determined for each cluster during execution of the k-means algorithm. Execution of an exemplary k-means algorithm is described below with reference to FIG. 5. Aspects of the disclosure are operable, however, with any k-means algorithm as known in the art.

Each of the clusters determined at 402 have properties including, for example, one or more of the following: a beacon identifier, a cluster number, a determined location and error radius of the beacon 104 using the position observations 204 associated with the cluster, a maximum time stamp associated with the position observations 204 associated with the cluster, and a minimum time stamp associated with the position observations 204 associated with the cluster. Aspects of the disclosure are operable, however, with additional or fewer properties.

At 404, the computing device 302 selects one of the clusters based on the timestamps associated with each of the grouped position observations 204. In some embodiments, the timestamps associated with the position observations 204 for one of the clusters is compared with the timestamps associated with the position observations 204 for another cluster. For example, the cluster having position observations 204 with the most recent timestamps is selected.

Based on the timestamp comparisons, aspects of the disclosure can determine if the beacon 104 is a "moved beacon." For example, if the timestamps associated with the position observations 204 in a first cluster are mutually exclusive to the timestamps associated with the position observations 204 in a second cluster (or the rest of the clusters), then the computing device 302 concludes that the beacon 104 has moved (e.g., between the first and second clusters). In this example, the cluster having position observations 204 with the most recent timestamps indicates the current position of the beacon 104, and is hence selected.

Aspects of the disclosure may also determine if the beacon 104 is a "moving beacon." For example, if the computing device 302 concludes that more than one cluster exists yet the timestamps associated with the position observations 204 for the clusters are not mutually exclusive (e.g., there is overlap between the position observations 204 for the clusters in time), then the computing device 302 concludes that the beacon 104 is moving. In this example, the cluster having position observations 204 with the most recent timestamps indicates the current position of the beacon 104, and is hence selected.

At 406, the computing device 302 calculates a position for the beacon 104 based on the position observations 204 corresponding to the selected cluster.

In some embodiments, the computer-executable components illustrated in FIG. 3 perform the operations, or portions thereof, illustrated in FIG. 4. The cluster component 314, when executed by the processor 304, causes the processor 304 to group position observations 204 for the beacon 104 into the plurality of clusters based on spatial distance (e.g., the error radius). The filter component 316, when executed by the processor 304, causes the processor 304 to analyze the timestamps associated with the position observations 204 corresponding to the clusters from the cluster component 314 to determine whether the timestamps associated with each cluster overlap with timestamps associated with any of the other clusters. The classification component 318, when executed by the processor 304, causes the processor 304 to define the beacon 104 as a moved beacon or a moving beacon based on the comparison performed by the filter component 316. The refiner component 320, when executed by the processor 304, causes the processor 304 to calculate a position for the beacon 104 based on the position observations 204 corresponding to the cluster selected by the filter component 316. In some embodiments, the cluster component 314, the filter component 316, the classification component 318, and the refiner component 320 are executed by a cloud-based service.

Referring next to FIG. 5, an exemplary flow chart illustrates the identification of a beacon 104 as a moved beacon or a moving beacon using a k-means clustering algorithm. Each of the mobile computing devices 102 creates a record identifying a beacon 104 observed by the mobile computing device 102 while the mobile computing device 102 is at a particular location at a particular time. For example, each record $\mathbb{R}_{b_i, t_j}$ includes the following fields:

$b_i$: beacon identifier (e.g. WiFi media access control address, mobile country code, mobile operator code, location area code, and/or cell identifier)

$t_j$: timestamp (e.g. in coordinated universal time)

location($\mathbb{R}_{b_i, t_j}$): the location of the mobile computing device 102 (e.g., as planetary coordinates including a latitude and longitude as determined by a global positioning system, or a signature of location such as a list of cellular towers)

The records may include more or less information. For example, the timestamp may be expanded to include a first observed time (e.g., the earliest observed time) and a last observed time (e.g., the most recent observed time). The records are collected from the plurality of mobile computing devices 102 and processed to create a set of observations representing the crowd-sourced data. For example, the mobile computing devices 102 send the records to a server such as computing device 302. The server, or another computing device separate from the server, may create the set of observations. In some embodiments, each of the observations has the following factors, properties, or dimensions: a latitude and longitude (of the observing mobile computing device), first observed time, and last observed time.

At 502, the server receives or accesses the set of observations relating to a beacon B. At 504, the server calculates the probable position of the beacon B using the set of observations. The server calculates the probable position of the beacon B based on the crowd-sourced data using a location determination algorithm such as known in the art. The output of the location determination algorithm is a probable position P that, in some embodiments, includes the following factor, properties, or dimensions: latitude and longitude (of the beacon B), an error radius, a first observed time and a last observed time. For example, the location determination algorithm computes position $P_{b_i}$ based on all records $\mathbb{R}_{b_i, t_j}$ for beacon i. In some embodiments, the position $P_{b_i}$ is composed of the following fields:

$b_i$: beacon identifier (e.g. WiFi media access control address, mobile country code, mobile operator code, location area code, and/or cell identifier)

location($P_{b_i}$): location of the beacon (e.g. as planetary coordinates including a latitude and longitude)

radius ($P_{b_i}$): radius of the beacon

The server compares the determined error radius with the pre-defined threshold radius 312. In the example of FIG. 5, the pre-defined threshold radius 312 is a function of beacon type. As such, the pre-defined threshold radius 312 is obtained by the function call RadiusThreshold(BeaconType (B)). If the error radius is less than a pre-defined threshold radius 312 at 506, then the server publishes P as the position for beacon B at 508. If the error radius is greater than the pre-defined threshold radius 312 at 506, the server applies a k-means clustering algorithm on the set of observations at

510. For example, if radius($P_{b_i}$)>$R_{b_i}$, where $R_{b_i}$ is the pre-defined threshold radius 312 for the beacon type associated with beacon B, the server considers the beacon to be either a moved beacon or a moving beacon. As such, the beacon B is a candidate for clustering.

The k-means clustering algorithm produces a set of K clusters each having a position and a set of observations. The k-means algorithm starts with K=2 and the geographic distance between each observation position (e.g., latitude and longitude) and the cluster centroid as the dimension. For example, the server applies the k-means clustering algorithm on all record $\mathbb{R}_{b_i,t_j}$ for beacon i to compute the clusters $\mathbb{C}_{l,b_i}$ for beacon i. In some embodiments, each cluster $\mathbb{C}_{l,b_i}$ is composed of the following fields:

- $b_i$: beacon identifier (e.g. WiFi media access control address, mobile country code, mobile operator code, location area code, and/or cell identifier)
- l: the cluster number
- location($\mathbb{C}_{l,b_i}$): location of the beacon (e.g. as planetary coordinates including a latitude and longitude)
- radius ($\mathbb{C}_{l,b_i}$): radius of the beacon
- $t_{max,l}$: the maximum time stamp of all $\mathbb{R}_{b_i,t_j}$ in $\mathbb{C}_{l,b_i}$
- $t_{min,l}$: the minimum time stamp of all $\mathbb{R}_{b_i,t_j}$ in $\mathbb{C}_{l,b_i}$ If the error radius for any of the clusters is greater than the pre-defined threshold radius 312 at 512, then K is increased by one at 516 (so long as K is not greater than or equal to the maximum value at 514). If K is greater than or equal to the maximum value for K at 514, then the process ends at 518 as an accurate position for beacon B cannot be determined. For example, radius ($\mathbb{C}_{l,b_i}$)>$R_{b_i}$ means that all records $\mathbb{R}_{b_i,t_j}$ for beacon i do not form k clusters, and k should be increased by one. Operations 510, 512, 514, and 516 are repeated until all records $\mathbb{R}_{b_i,t_j}$ for beacon i form k clusters (e.g., either radius($\mathbb{C}_{l,b_i}$)≤$R_k$ or k>$k_{max}$).

If the error radius for each cluster is less than or equal to pre-defined threshold radius 312 at 512, the server selects the cluster with the most recent timestamp at 520. For example, the server finds the $\mathbb{C}_{l,b_i}$ that has the maximum $t_{max,l}$.

The server proceeds to examine the timestamps associated with each of the clusters to determine whether any overlap exists in time (e.g., whether K cohesive clusters were formed). For example, the server compares the timestamp range of the selected cluster with the timestamp ranges of the other clusters. If there is no overlap at 522, the server concludes that beacon B is a moved beacon at 524. The server publishes the position of the selected cluster as the current position of beacon B. If there is overlap in the timestamp ranges at 522, the server concludes that beacon B is a moving beacon at 526. The server publishes the position of the selected cluster as the most recent position of beacon B.

For example, suppose the selected cluster number is m. The server compares $t_{min,m}$ with all $t_{max,l}$ where l< >m. If $t_{max,l}$-$t_{min,m}$≤$T_{overlap}$, where $T_{overlap}$ is a predefined parameter, the server publishes location($\mathbb{C}_{m,b_i}$) as the location for beacon $b_i$. Otherwise, the server considers the beacon to be a moving beacon.

Figure 6:
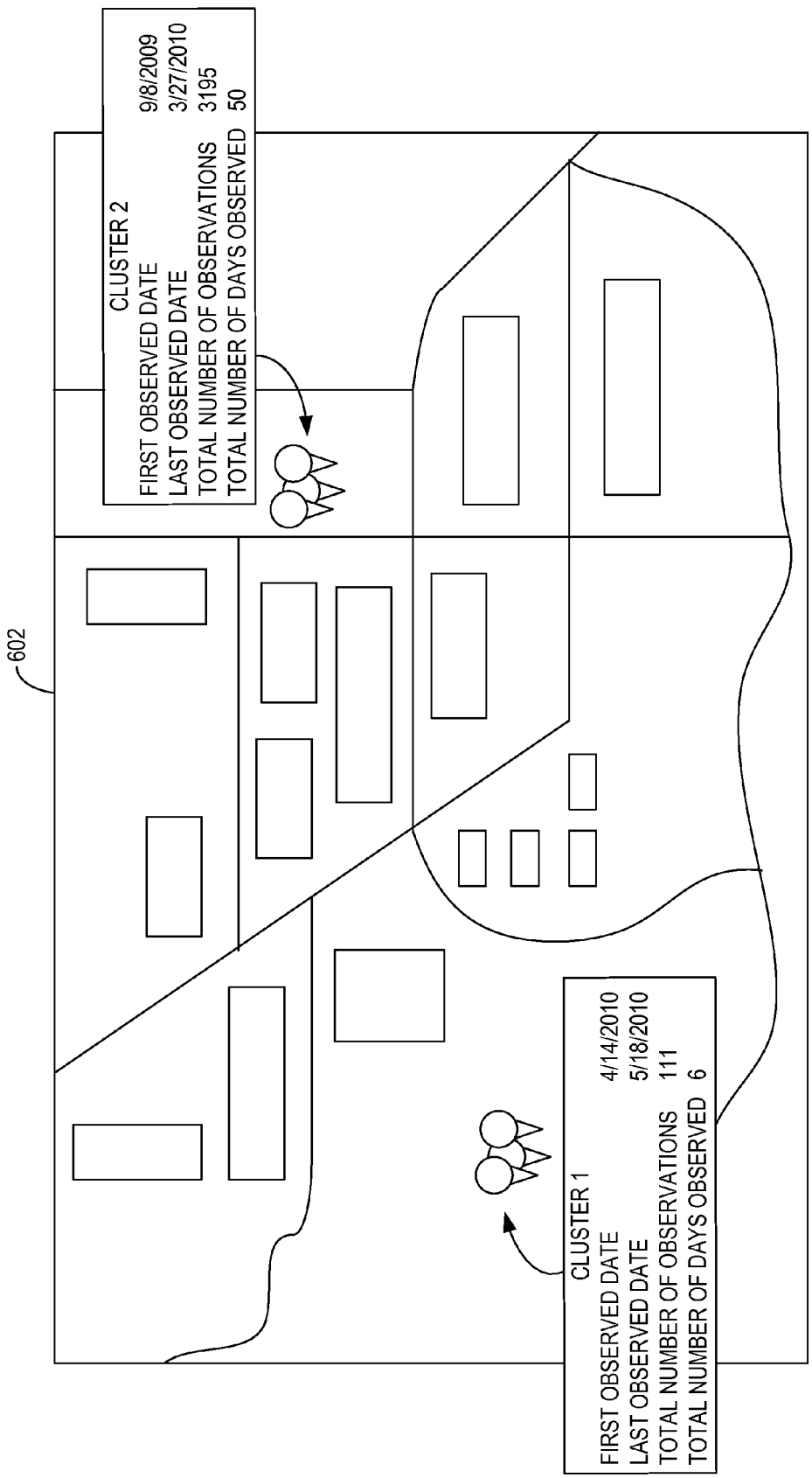
FIG. 6 is an exemplary map showing two clusters of position observations.

Referring next to FIG. 6, an exemplary block diagram illustrates a map 602 showing two clusters of position observations for a particular beacon. In this example, there are two clusters. In Cluster 1, the first observed date is Apr. 14, 2010, the last observed date is May 18, 2010, there are 111 observations associated with the beacon, and the beacon was observed for 6 days. In Cluster 2, the first observed date is Sep. 8, 2009, the last observed date is Mar. 27, 2010, there are 3195 observations associated with the beacon, and the beacon was observed for 50 days.

In the example of FIG. 6, the clustering algorithm identifies Cluster 1 and Cluster 2 as cohesive, mutually exclusive clusters because the timestamps associated with the observations do not overlap. As such, the result of applying the operations on FIG. 5 is that the beacon has moved once and is presently located at the position of Cluster 1 at least because Cluster 1 has the latest observations.

Additional Examples

Some embodiments of the disclosure contemplate three-dimensional movement. For example, aspects of the disclosure operate to identify changes in elevation for a beacon 104 (e.g., the beacon 104 changed floors in an office building). In such embodiments, the position information is three-dimensional. For example, the position information includes not only latitude and longitude values, but also an elevation or altitude value.

At least a portion of the functionality of the various elements in FIG. 3 may be performed by other elements in FIG. 3, or an entity (e.g., processor, web service, server, application program, computing device, etc.) not shown in FIG. 3.

In some embodiments, the operations illustrated in FIG. 4 and/or FIG. 5 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for determining whether the beacon 104 is a moved beacon or a moving beacon using a clustering analysis, and exemplary means for performing a clustering analysis to define the plurality of clusters.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for determining a position for a beacon using a clustering analysis, said system comprising:
   a memory area associated with a computing device, said memory area storing a plurality of position observations for one beacon, each of said position observations having a timestamp associated therewith; and
   a processor programmed to:
      determine, for the beacon, a position and associated error radius based on the plurality of position observations stored in the memory area;
      compare the determined error radius with a pre-defined threshold radius; and
      based on the comparison, calculate a revised position for the beacon by:
         grouping the position observations for the beacon into a plurality of clusters based on spatial distance;
         selecting one of the plurality of clusters based on the timestamps; and
         determining the revised position for the beacon based on the position observations corresponding to the selected cluster.

2. The system of claim 1, wherein the processor is programmed to calculate the revised position if the determined error radius exceeds the pre-defined threshold radius.

3. The system of claim 1, wherein the processor is further programmed to receive the position observations from a plurality of computing devices.

4. The system of claim 1, wherein the plurality of position observations comprise crowd-sourced records each identifying one or more beacons observed by one of a plurality of mobile computing devices.

5. The system of claim 1, further comprising means for determining whether the beacon is a moved beacon or a moving beacon using a clustering analysis.

6. The system of claim 1, further comprising means for performing a clustering analysis to define the plurality of clusters.

7. A method comprising:
   grouping, by a computing device, position observations for one beacon into a plurality of clusters based on spatial distance, each of said position observations having a timestamp associated therewith;
   selecting, by a computing device, one of the plurality of clusters based on the timestamps associated with the position observations corresponding to the clusters; and
   calculating, by a computing device, a position for the beacon based on the position observations corresponding to the selected cluster.

8. The method of claim 7, wherein selecting one of the plurality of clusters comprises selecting one of the clusters having position observations with the most recent timestamps.

9. The method of claim 7, wherein grouping the position observations into the plurality of clusters comprises identifying one or more of the following: a beacon identifier, a cluster number, a location of the beacon, a radius of the beacon, a maximum time stamp associated with the position observations, and a minimum time stamp associated with the position observations.

10. The method of claim 7, wherein grouping the position observations into the plurality of clusters comprises performing a k-means clustering analysis with spatial distance as a partition dimension.

11. The method of claim 7, further comprising receiving the position observations, wherein receiving the position observations comprises receiving, from a mobile computing device, a location of the mobile computing device and a set of beacons observed by the mobile computing device.

12. The method of claim 7, further comprising comparing the timestamps associated with the position observations in a first cluster with the timestamps associated with the position observations in a second cluster.

13. The method of claim 12, further comprising defining the beacon as a moved beacon if the timestamps associated with the position observations in the first cluster are mutually exclusive to the timestamps associated with the position observations in the second cluster.

14. The method of claim 12, further comprising defining the beacon as a moving beacon if the timestamps associated with the position observations in the first cluster are not mutually exclusive to the timestamps associated with the position observations in the second cluster.

15. The method of claim 7, further comprising determining a position and an error radius for the beacon based on the position observations, and wherein said grouping, said selecting, and said calculating are performed only if the determined error radius exceeds a pre-defined threshold radius.

16. The method of claim 15, wherein the threshold radius is defined based on a type of the beacon.

17. One or more computer memories having computer-executable components, said components comprising:
- a cluster component that when executed by at least one processor causes the at least one processor to group position observations for one beacon into a plurality of clusters based on spatial distance, each of said position observations having a timestamp associated therewith; and
- a filter component that when executed by at least one processor causes the at least one processor to analyze the timestamps associated with the position observations corresponding to the clusters from the cluster component to determine whether the timestamps associated with each cluster overlap with timestamps associated with any other cluster; and
- a classification component that when executed by at least one processor causes the at least one processor to define the beacon as a moved beacon or a moving beacon based on the comparison performed by the filter component.

18. The computer memories of claim 17, further comprising a refiner component that when executed by at least one processor causes the at least one processor to calculate a position for the beacon based on the position observations corresponding to a cluster selected based on the timestamps by the filter component.

19. The computer memories of claim 17, wherein the spatial distance includes elevation.

20. The computer memories of claim 17, wherein the cluster component, the filter component, and the classification component are executed by a cloud-based service.

* * * * *